United States Patent [19]

Turkowski

[11] Patent Number: 5,594,919
[45] Date of Patent: Jan. 14, 1997

[54] METHOD AND SYSTEM FOR REORDERING BYTES IN A DATA STREAM

[75] Inventor: Kenneth E. Turkowski, Palo Alto, Calif.

[73] Assignee: Apple Computer, Inc., Cupertino, Calif.

[21] Appl. No.: 458,496

[22] Filed: Jun. 2, 1995

Related U.S. Application Data

[63] Continuation of Ser. No. 58,429, May 7, 1993, Pat. No. 5,524,256.

[51] Int. Cl.$^6$ ................................................ G06F 7/00
[52] U.S. Cl. .................. 395/800; 395/300; 364/DIG. 1; 364/259; 364/260.4
[58] Field of Search .......................... 395/700, 800, 395/500

[56] References Cited

U.S. PATENT DOCUMENTS

| | | | |
|---|---|---|---|
| 3,812,467 | 5/1974 | Batcher | 395/800 |
| 4,866,421 | 9/1989 | Szczepanek | 340/825.52 |
| 4,918,600 | 4/1990 | Harper, III et al. | 395/484 |
| 4,931,925 | 6/1990 | Utsumi et al. | 395/775 |
| 5,107,415 | 4/1992 | Sato et al. | 395/800 |
| 5,265,237 | 11/1993 | Tobias et al. | 395/500 |
| 5,398,328 | 3/1995 | Weber et al. | 395/500 |

*Primary Examiner*—Mehmet B. Geckil
*Attorney, Agent, or Firm*—Carr, DeFilippo & Ferrell

[57] ABSTRACT

A method and system are disclosed for efficiently translating data from one known data sequencing arrangement to an alternative sequencing arrangement. The method consists of the steps of generating a source sequence signal which identifies the ordering of units within the source sequence, generating a destination sequence signal which identifies the ordering of units within the destination sequence, and combining the source signal and destination signal to produce a permutation signal which defines the relationship between the source sequence and the destination sequence. Once the permutation signal has been defined, this permutation signal is applied to the source sequence to allow the reordering of the source sequence into the desired destination sequence. A reordering circuit is used to rearrange the source sequence units into the desired destination sequence units utilizing the permutation signal generated in the present invention. The reordering circuit consists of an array of ordered swap units which contain inputs for source sequence signals and permutation signals, and outputs which propagate destination sequences.

10 Claims, 10 Drawing Sheets

ENDIAN CODES

| ORDERING | WITHIN | BIG E | LITTLE E (HEX) |
|---|---|---|---|
| BYTE | WORD 16 | 0 | 01 |
| WORD 16 | WORD 32 | 0 | 02 |
| WORD 32 | WORD 64 | 0 | 04 |
| WORD 64 | 128 BITS | 0 | 08 |
| 128 BITS | 256 BITS | 0 | 10 |
| 256 BITS | 512 BITS | 0 | 20 |
| 512 BITS | 1024 BITS | 0 | 40 |
| 1024 BITS | 2048 BITS | 0 | 80 |

ENDIAN CODES FOR POPULAR PROCESSORS

| TYPE | PROCESSORS | CODE (HEX) |
|---|---|---|
| BIG ENDIAN | MOTOROLA 680X0, MIPS; SPARC | 00 |
| HYBRID | DEC PDP-11 | 01 |
| HYBRID | DEC VAX | 03 |
| LITTLE ENDIAN | INTEL 80X86 | FF |

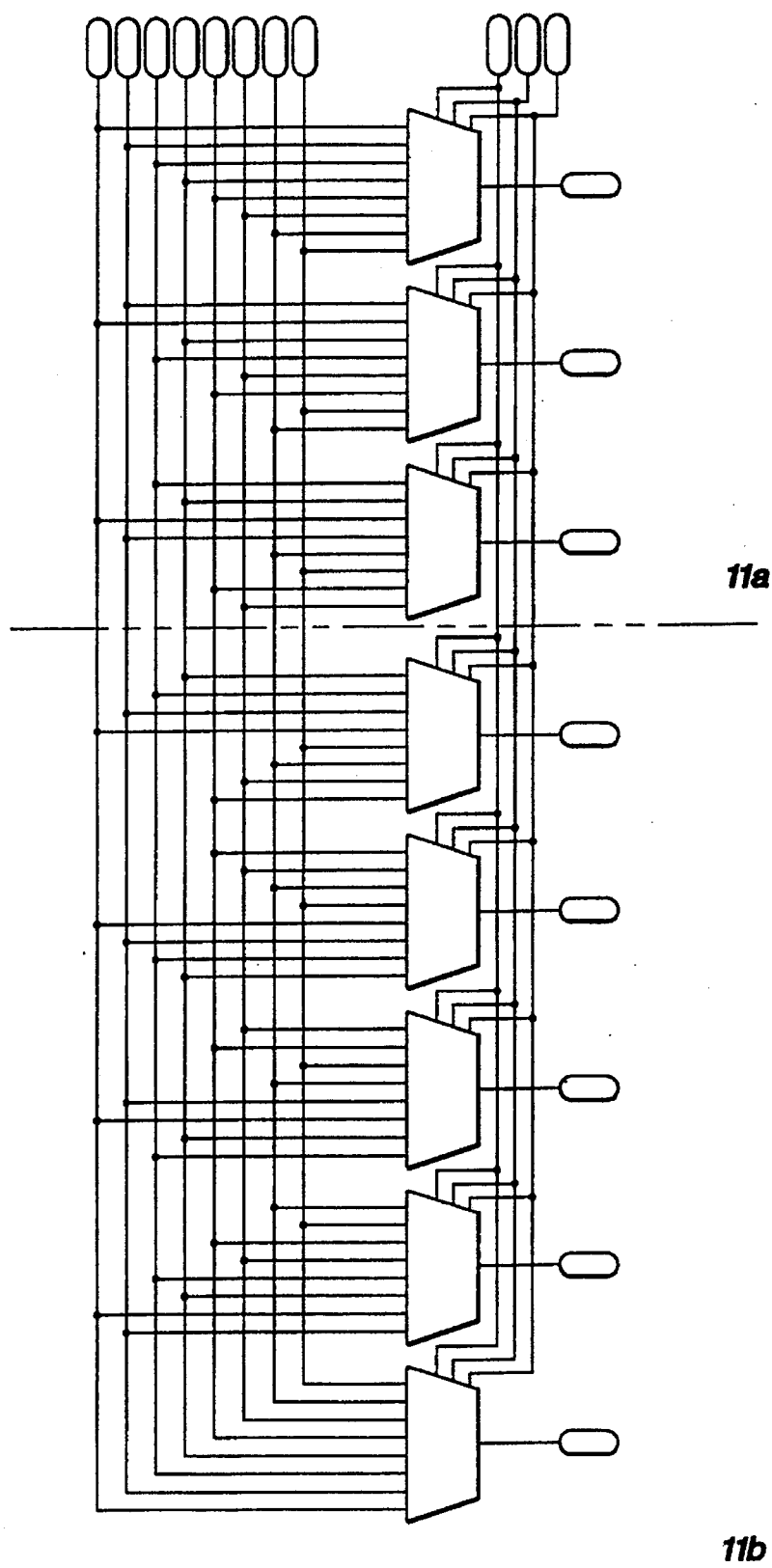
FIG. 11 (MAP)

METHOD AND SYSTEM FOR REORDERING
BYTES IN A DATA STREAM

This is a continuation of application Ser. No. 08/058,429, filed on May 7, 1993, and now U.S. Pat. No. 5,524,256.

BACKGROUND OF THE INVENTION

1. Field of the Invention

This invention relates to the organization of computer data and more particularly to a method and system for translating between data structures used in different computer architectures. The present invention enables one computer to read and reorder data bytes which are generated by another computer system using a differing byte ordering scheme.

2. Description of the Background Art

One of the most ubiquitous problems in data interchange between heterogeneous computer systems is breaking up larger quanta of data into smaller quanta of data, and conversely, assembling larger quanta of data from smaller quanta. Data contained in a data stream is generally arranged as either big-endian, little-endian, or some hybrid of the two. In a "big-endian" (from the description "big end") arrangement, the most significant unit of a data word is transmitted first, followed by units of descending radix value until the least significant unit is transmitted. It should be noted that a unit is commonly defined as some number of bits or a byte (where a byte is eight bits) and that a word is some number of bytes. Big-endian sequencing is motivated in part by the western tradition of reading written text from left to right. Since the most significant unit of a number read from left to right is encountered first, transmission of numbers from left to right as they might appear on a display terminal or a printed page is a natural sequencing. A second motivation for the big-endian sequencing scheme arises from the efficiency associated with transmitting the most significant unit first. From the standpoint of transmitting the most amount of information in the shortest amount of time, it makes sense to transmit the most significant data first, since gross decisions can be made based on order-of-magnitude information contained in the high-order bytes. Certainly in many mathematical operations, some processing can occur on the most significant components of a data stream even as the processor is waiting for the lower end bytes of the data components to arrive. The line of Macintosh computers (manufacture by Apple Computer Company of Cupertino, Calif.) uses the big-endian data structure.

Little-endian data packing, derived from "little end", is the converse of the big-endian scheme. The least significant unit is transmitted first, followed by units representing values of increasing numerical significance. A motivation for the use of the little-endian scheme is that the data is organized conveniently and logically as a function of increasing radix. The first value transmitted is $2^{0*n}$, the second value is $2^{1*n}$, and so on, where n represents the number of bits per unit (n=8 when the unit is a byte). This sequencing is particularly useful since all addition functions require a carry calculation on the least significant bits before higher-order bits can be processed.

Other organization systems commonly combine features of the big-endian and little-endian conventions to produce hybrid data packing schemes. For purposes of comparing various hybrid structures, it is useful to define the big-endian scheme as a sequence of bytes arranged as:

Big-endian: 0 1 2 3 4 5 6 7 where 0 represents the most significant byte of an eight byte word, and 7 represents the least significant byte. Similarly the little-endian structure would be represented as:

Little-endian: 7 6 5 4 3 2 1 0 The number 7 represents the most significant byte of an eight byte word, and 0 represents the least significant byte. A single byte is alternatively defined as a "Word8", a 16-bit quantity as a "Word16", a 32-bit word as a "Word32", and so on, to simplify the forthcoming discussion. The PDP-11 (formerly manufactured by Digital Equipment Corporation of Maynard, Mass.) using the same representations of most and least significant bytes (Word8's), is represented as:

PDP-11 little-endian: 1 0 3 2 5 4 7 6. The VAX computer line of computers, also manufactured by Digital Equipment Corporation, is represented as:

VAX little-endian: 3 2 1 0 7 6 5 4. A pure big-endian packing mechanism packs Word8's into Word16's in a big-endian manner, that is the most significant Word8 is packed first, then the least significant Word8 is packed. Likewise, Word16's are packed into Word32's in a big-endian manner, Word32's into Word64's, in a big endian manner, etc. A pure little-endian packing mechanism packs Word8's into Word16's in a little-endian manner, starting with the least significant Word8 and followed by the most significant Word8. Similarly, Word16's are packed into Word32's, Word32's into Word64's, and so on, in a little-endian manner. The PDP-11 structure shown above, packs Word8's into Word16's in a little-endian manner, but packs Word16's into Word32's and Word32's into Word64's in a big-endian manner. The VAX, which succeeded the PDP-11, packs Word8's into Word16's and Word16's into Word32's in a little-endian manner, but packs Word32's into Word64's in a big-endian manner. The motivation for this change in structure between the PDP-11 and the VAX is that at the time of the PDP-11, 32-bit data types were not supported by the hardware, and during the time of the VAX, 64-bit data types were not supported by the hardware. Currently, 64-bits is the largest primitive data type supported on most computers, although this will likely change in the future.

The major problem associated with the various arrangements of data strings used by different computers is that communication between these computers is extremely cumbersome at best, and impossible in the normal course of network communication. What is needed is a method and system for efficiently translating data from a known-endian arrangement to an alternative-endian scheme.

SUMMARY OF THE INVENTION

In accordance with the present invention, a method and system are disclosed for efficiently translating data from one known endian arrangement to an alternative-endian scheme. The first step of the method involves defining a source sequence code and a destination sequence code which contains information relating to the ordering of units within the source and destination sequences. Once the endian codes are defined for the source and the destination sequences, a permutation code is defined which describes the relationship between the source sequence and the destination sequence. Using this permutation code, the units in the source sequence are reordered to the desired destination sequencing.

A reordering circuit is used to rearrange the source sequence units into the target destination sequence units utilizing the permutation signals defined above. The reordering circuit consists of an array of ordered swap units which contain inputs for source sequence units and permutation codes and outputs which propagate destination sequences.

DESCRIPTION OF THE PREFERRED EMBODIMENT

Figures 1, 2:
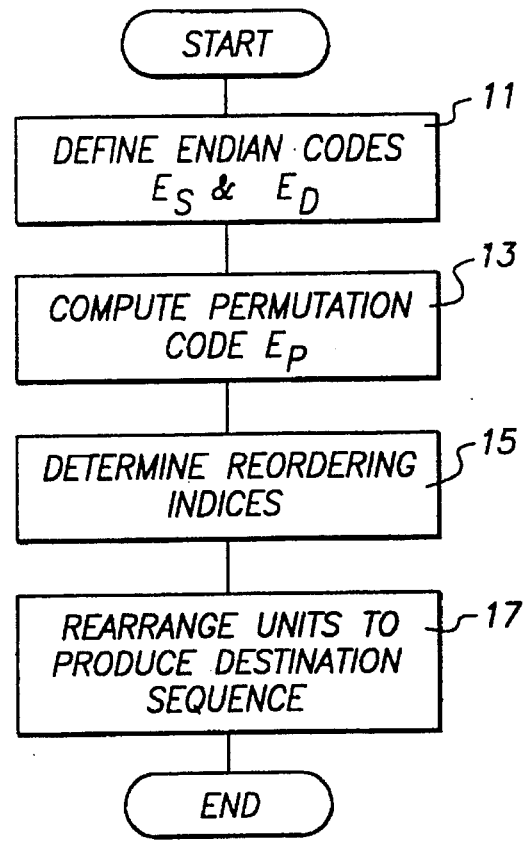
FIG. 1 is a flow chart showing the method of translating the ordering of unit bytes from a source sequencing scheme to a destination sequencing scheme in a computer data stream.
FIG. 2 is a table showing the big- and little-endian codes used to define the source and destination sequences in the method of FIG. 1.

Referring now to FIG. 1, a method is shown for translating the ordering of data units from a source sequencing scheme to a destination sequencing scheme in a computer data stream. The method begins with step 11 by defining endian codes for source ($E_S$) and destination ($E_D$) sequences. The source and destination sequences are strings of data that are either being used, transmitted or stored by a processor in a computing environment. As a generalization, sequences consist of groups of bits referred to as data units. A unit can contain a single bit or any number of bits; in the preferred embodiment, the data are grouped in strings of eight bits, defined as bytes. Groups of bytes are defined by their conventional terms to include Word16 (a double-byte word, also called a short word), Word32 (a string of two double byte words, often referred to as a long word), Word64 (a string of two quad-byte words, also referred to as a double word), etc.

Referring now to FIG. 2, a coding scheme of the present invention is shown in which hexadecimal (hex) weights are assigned to orderings of bytes contained within data streams. The first line of the data table in FIG. 2 shows that the ordering of a byte within a Word16 is represented by a zero when Word16 is arranged in big-endian form (i.e., the most significant byte is transmitted first), and the Word16 is represented by hexadecimal 01 (01 hex) when represented in little-endian form (where the least significant byte is transmitted first). Similarly from the second line of the table of FIG. 2, a Word32 containing two ordered Word16's is represented by a zero when Word32 is composed of two Word16's arranged in big-endian form and Word32 is represented as a hexadecimal 02 when Word32 is composed of two Word16's arranged in little-endian form. It should be noted that in FIG. 2 all of the orderings which are in big-endian form are assigned a value of zero. The value of a little-endian representation, however, changes for each ordering depending on the size of the word in which the reorderings are required. The table of FIG. 2 can be easily extrapolated to include larger orderings than those shown.

Figures 3, 4:
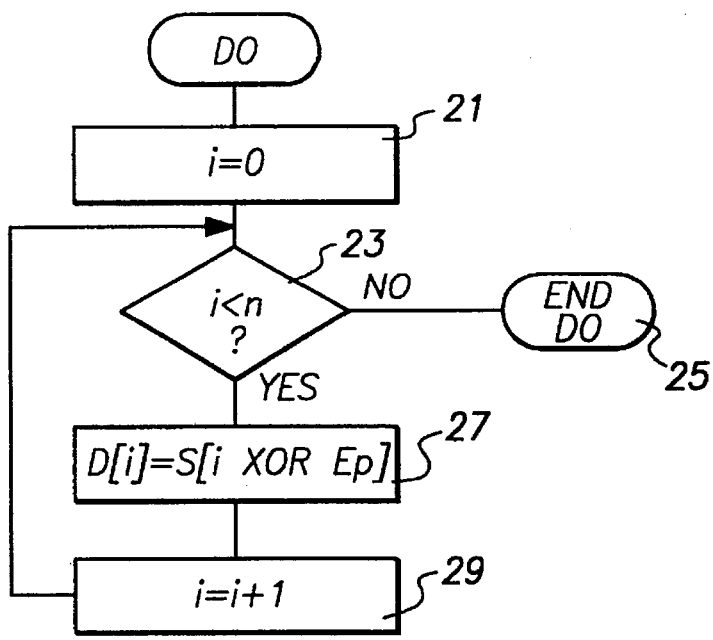
FIG. 3 is a table identifying endian codes for popular processors using the table of FIG. 2.
FIG. 4 is a flow chart showing the details of the step of determining reordering indices for the method of FIG. 1.

Referring now to FIG. 3, the code for $E_S$ and $E_D$ for popular processors are shown in FIG. 3. The Motorola 680X0 (Motorola Inc., Schaumburg, Ill., the MIPS (Silicon Graphics, Inc., Mountain View, Calif.), and the Sparc (Sun Microsystems, Inc., Mountain View, Calif.) processors, all use big-endian data arrangements and are assigned a code of 00 hex. As described above, the DEC PDP-11 is a hybrid processor and is assigned a code of 01 hex. The DEC VAX is also a hybrid and is assigned a code of 03 hex.

In step 13, a permutation code $E_P$ is computed from the equation:

$$E_P = (E_S \text{ XOR } E_D) \text{ AND } (n-1)$$

and represents the endian-ordering relationship between the endian ordering $E_S$ of the source sequence and the endian ordering $E_D$ of the destination sequence. In the above equation for Ep, n represents the number of bytes in the desired data set, and the symbol XOR represents a logical exclusive OR operation.

Following the computation of the permutation code $E_P$ in step 13, reordering indices are determined in step 15. Reordering indices are numerical pointers which identify the rearrangement of bytes. Each source sequence position has an index pointer identifying the byte's location in the sequence. The first byte is indexed as 0. The next byte is 1, and the index number increases through the sequence. A similar indexing exists for the destination sequence, and the object of step 15 is to translate the byte from its indexed position in the source sequence to an appropriate position in the destination sequence, as identified by the reordering index. The method for determining the reordering indices is shown in FIG. 4. The first step of FIG. 4 is to establish an index counter i which is set to zero in step 21. Index counter i is a positive integer ranging from zero to n−1, where n is equal to the number of bytes in the source sequence for which translation to a destination sequence is desired. In step 23 a determination occurs as to whether i is less than n. If i is not less than n, then all indices have been determined and the process ends in step 25 and returns to step 17 for reordering of the bytes to the destination sequence. If i is less than n, then the destination reordering index is calculated for byte i of the source sequence. The destination reordering index is calculated by logically combining the index counter i with the permutation code $E_P$ using an exclusive OR function. The equation for determining reordering indices shown in step 27 is:

$$D[i]=S[i \text{ XOR } E_P]$$

Following the determination of the reordering value D[i] for i in step 27, the index counter i is incremented in step 29 and the method of FIG. 4 proceeds back to step 23 where the value for i is retested against the total number of bytes n. The process of step 15 continues until a reordering value D[i] has been calculated for each byte of the source data sequence represented by index counter i. In step 17 of FIG. 1, the source sequence bytes are then rearranged to produce the desired destination sequence using the reordering indices calculated in step 15.

Figure 5A:
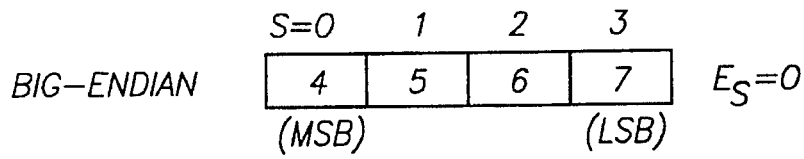
FIGS. 5(a) and 5(b) are diagrams showing an example reordering from a big-endian source sequence of the bytes containing the number 4567 to a corresponding little-endian destination sequence, using the method of FIG. 1.
Figure 5B:
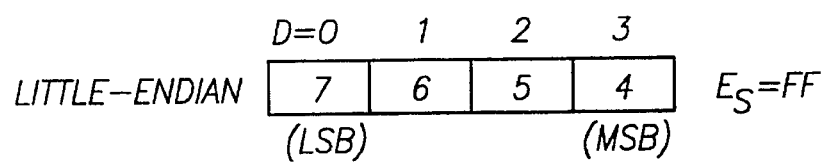

Referring now to FIGS. 5(a) and 5(b), an example is shown in which the method steps of FIG. 1 are utilized to convert a source sequence "4567" from the big-endian representation shown in FIG. 5(a) to a little-endian representation as shown in FIG. 5(b). The data representation of FIG. 5(a) in big-endian format shows the number "4567" contained in four bytes indexed as i=0 for the most significant byte, 4, through i=3 for the least significant byte, 7. Referring also to the method steps of FIG. 1, in step 11 the endian codes are defined for the source sequence ($E_S$) and the destination sequence ($E_D$) using the table of FIG. 2. Since the source sequence is in big-endian format, $E_S$ is equal to zero ($E_S$=0). The target destination sequencing in this example is little-endian for a WORD32 comprised of four bytes. Reading from FIG. 2, two adjacent bytes in a WORD16 which are arranged in little-endian format are assigned the code of 01 hex. Two adjacent WORD16's in a WORD32 in little-endian form are assigned the code of 02 hex. In order to arrive at $E_D$, the individual codes are added together. In the case of the present example, $$\text{hex } 01 + \text{hex } 02 = \text{hex } 03$$

which is represented in binary as $11_2$. The value for the destination endian code could also easily have been determined by reference to FIG. 3, in which it is shown that all pure little-endian codes are represented by FF hex for practical sequence lengths. Since the unit of data to be swapped is 4 bytes in length in the present example, only the first two least significant units ($11_2$) of the binary representation of FF hex are required to implement the reordering.

Referring now to step 13 of FIG. 1, the permutation code $E_P$ is computed from the equation:

$$E_P = (E_S \text{ XOR } E_D) \text{ AND } (n-1).$$

where n is equal to the number of units (bytes) in the sequence. The number of bytes in the present example is 4, and therefore n=4. Plugging the known values into the equation of step 13:

$$E_P = (0 \text{ XOR } FF) \text{ AND } (4-1) = FF \text{ AND } 3 = 3.$$

From step 15, the reordering indices are determined using the flow chart of FIG. 4. In step 21, i is set equal to zero. In step 23, since i=0 and is therefore less than 4, the method proceeds to step 27, where the indexed reordering calculation proceeds, solving:

$$D[i]=S[i \text{ XOR } E_P].$$

For i=0, $$D[0]=S[0 \text{ XOR } 3]=S[3]$$

From this first pass through the flow chart of FIG. 4, it has been determined that the number "7" occupying the last byte, S=3, of the source sequence in FIG. 5(a) moves to the D=0 position in the destination sequence shown in FIG. 5(b). Iterating again through the flow chart of FIG. 4, for i=1, $$D[1]=S[1 \text{ XOR } 3]=S[2]$$

Therefore, the number "6" moves from the S=2 position in FIG. 5(a) to the D=1 position in the little-endian, destination sequence of FIG. 5(b). Continuing through the method of FIG. 4, where i=2, $$D[2]=S[2 \text{ XOR } 3]=S[1]$$

The number "5" in the S=1 position of the big-endian source sequence representation of FIG. 5(a) moves to the D=2 position in the little-endian destination representation of FIG. 5(b). Finally, for i=3, $$D[3]=S[3 \text{ XOR } 3]=S[0]$$

The number "4" moves from the S=0 position in the big-endian source representation of FIG. 5(a) to the D=3 position in the little-endian destination sequence of FIG. 5(b).

Continuing with the method, in step 29, i is incremented to 4 and in step 23, i=4 is no longer less than n=4 and therefore the method steps of FIG. 4 end, and control is returned to step 17 of FIG. 1. Subsequently, in step 17, the bytes are rearranged from the big-endian representation to the little-endian representation of FIG. 5(b).

Although the present example demonstrates the method of FIG. 1 for data sequences having 4 bytes, this same method is applicable to data sequences of any length. The present method is particularly useful for sequences having n-values equal to an exponent of 2, i.e., 2, 4, 8, 16, 32, etc.; however, other-length sequences can also be reordered using this method, although additional steps will be required to correctly orient the data within the sequence.

Figure 6:
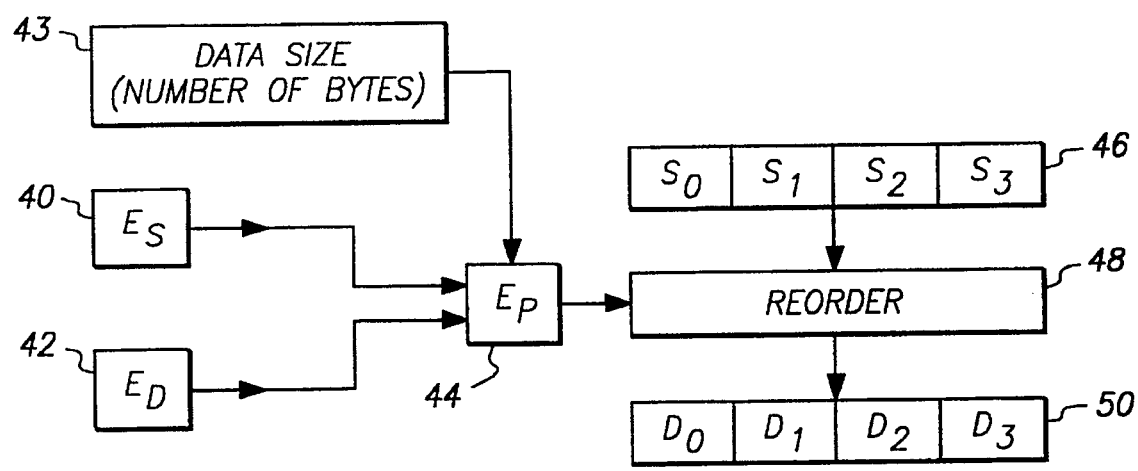
FIG. 6 is a signal flow diagram showing an overview of the translation of a source sequence into a destination sequence responsive to a permutation signal, Ep.

Referring now to FIG. 6, a signal flow diagram is shown illustrating an overview of the translation of a source sequence 46 into a destination sequence 50 responsive to a permutation signal 44. In the preferred embodiment, a source sequence signal 40 is produced by a computing system using a look-up table or equivalent, implementing the techniques described above. Likewise, a destination sequence signal 42 is also generated which describes the ordering of a desired destination sequence 50. The signals 40 and 42 comprise a string of binary data which identify the endian coding of the source and destination sequences 46,50. The data size (n) 43 represents the sequence sizes of both the source sequence 46 and the destination sequence 50. Using the logical relationship $$E_P = (E_S \text{ XOR } E_D) \text{ AND } (n-1)$$

a permutation signal 44 is generated which is used to instruct the computing system as to the translation of the source sequence 46 into the destination sequence 50 in reorder unit 48. As implemented in a computing system, the source sequence 46 and the destination sequence 50 are preferably memory units which contain the sequencing data. Source sequence signal 40 and destination sequence signal 42 are calculated results produced from the logical combination of data stored in a look-up table. Permutation signal 44 results from the logical combination of source sequence signal 40, data size (n) 43, and destination sequence signal 42 as described above. Reorder unit 48 may be implemented as either a hardware implementation as discussed below or as a software implementation, comprising a sequence of computer program steps implementing the methods discussed above.

Figure 7:
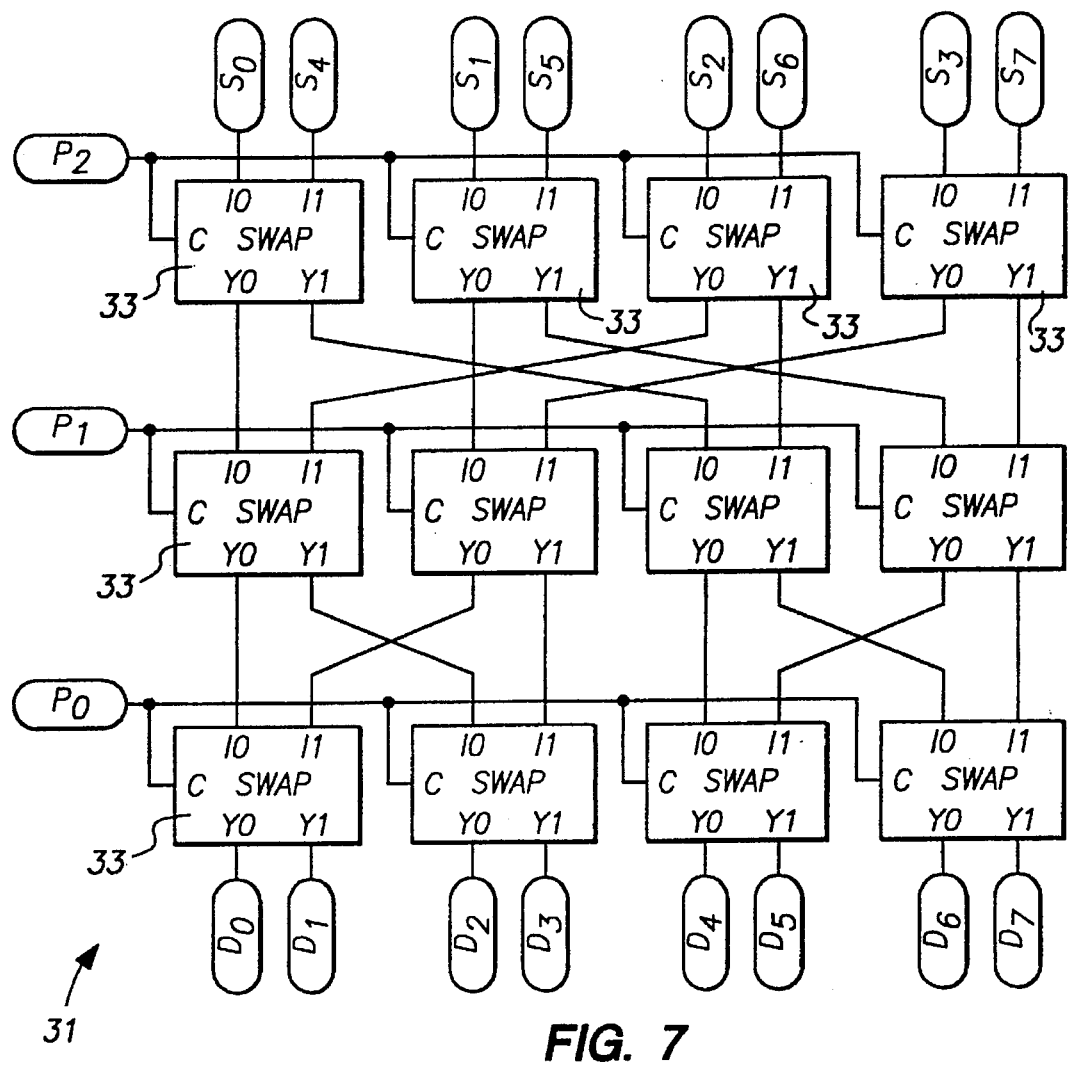
FIG. 7 is a schematic diagram showing the preferred circuit embodiment for implementing the reordering method of FIG. 1 using multi-layered combinational logic.

Referring now to FIG. 7, a schematic diagram is shown of a hardware circuit for reordering bytes from a source sequence to a destination sequence given a known permutation code, $E_P$. Sequence translator 31 implements steps 15 and 17 of FIG. 1, in which the ordering indices are determined and the bytes are rearranged to the destination packing sequence. Sequence translator 31 converts eight source bytes $S_0$-$S_7$ into eight translated or resequenced destination bytes $D_0$-$D_7$, using the permutation code $E_P$ having code bits $P_0$-$P_2$. The circuit consists of twelve swap cells 33 arranged in an ordered sequence and combination. It should be noted that the eight-bit embodiment of the sequence translator 31, is exemplary only and can be easily scaled to handle orderings of higher or lower bytes. The general structure of the sequence translator 31 of FIG. 7 consists of three rows of swap cells 33 each row controlled by a permutation code $P_0$, $P_1$, or $P_2$. The top row controlled by $P_2$, contains four swap cells 33, and each swap cell contains inputs for two source bytes: $S_0$, $S_4$; $S_1$, $S_5$; $S_2$, $S_6$; and $S_3$, $S_7$. The $P_2$ row of swap cells 33 functions to swap long words (WORD32) in an eight-byte source sequence. That is, when $P_2$ has a logical value of 1, each of the two long words in the eight-byte source sequence effectively switch positions. Similarly, in the second row of swap cells 33 controlled by permutation code $P_1$, short words (WORD16's) are swapped when permutation code $P_1$ is set to 1 (i.e., $P_1$ is logically true). Finally, the bottom row of swap cells 33, controlled by permutation code $P_0$, swap individual adjacent bytes when $P_0=1$. The net effect is to translate a sequence of source bytes into a sequence of translated destination bytes according to the permutation codes $P_0$, $P_1$, and $P_2$.

Figure 8:
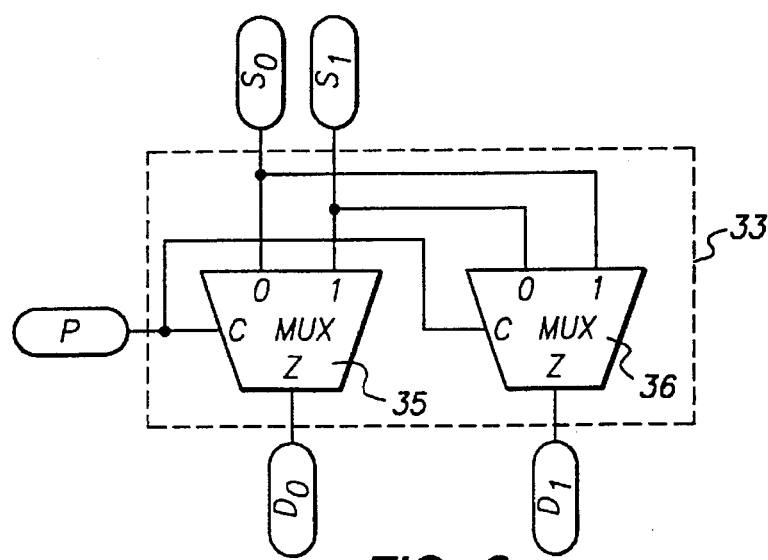
FIG. 8 is a schematic diagram showing details of the SWAP block used in the preferred embodiment of FIG. 7.

Referring now to FIG. 8, the implementation of a swap cell 33 is shown, in which the state of a permutation code input P determines whether two-input source bytes will swap positions at the output of the cell. Swap cell 33 consists of a pair of multiplexers 35,36 in which each of the two multiplexers receive as inputs the bytes from the source sequence $S_0$ and $S_1$. The inputs $S_0$ and $S_1$ but in the opposite are identical, for each of the two multiplexers 35,36. $S_0$ is connected to the 0 input of multiplexer 35 and $S_1$ is connected to the 1 input of multiplexer 35. When permutation code P=0, $S_0$ is propagated through multiplexer 35 and appears at output $D_0$. When permutation code P=1, $S_1$ which is present at the 1 input of multiplexer 35 appears as the output $D_0$. Similarly, multiplexer 36 has as its 0 input $S_1$, and as its 1 input $S_0$. When P=0, $S_1$ (appearing at the 0 input of multiplexer 36) is transmitted through the multiplexer 36 to output $D_1$. When permutation code P is equal to 1, $S_0$ which is present at the 1 input of multiplexer 36 is transmitted through to output $D_1$. The consequence then of permutation code P being 0, is that outputs $D_0$ and $D_1$ have as outputs, $S_0$ and $S_1$ respectively. When P=1, $D_0$ and $D_1$ are equal to $S_1$, $S_0$ respectively. The effect of $P_0$ switching from a 0 state to a 1 state is that the inputs $S_0$ and $S_1$ are switched at the outputs $D_0$ and $D_1$.

Figure 9:
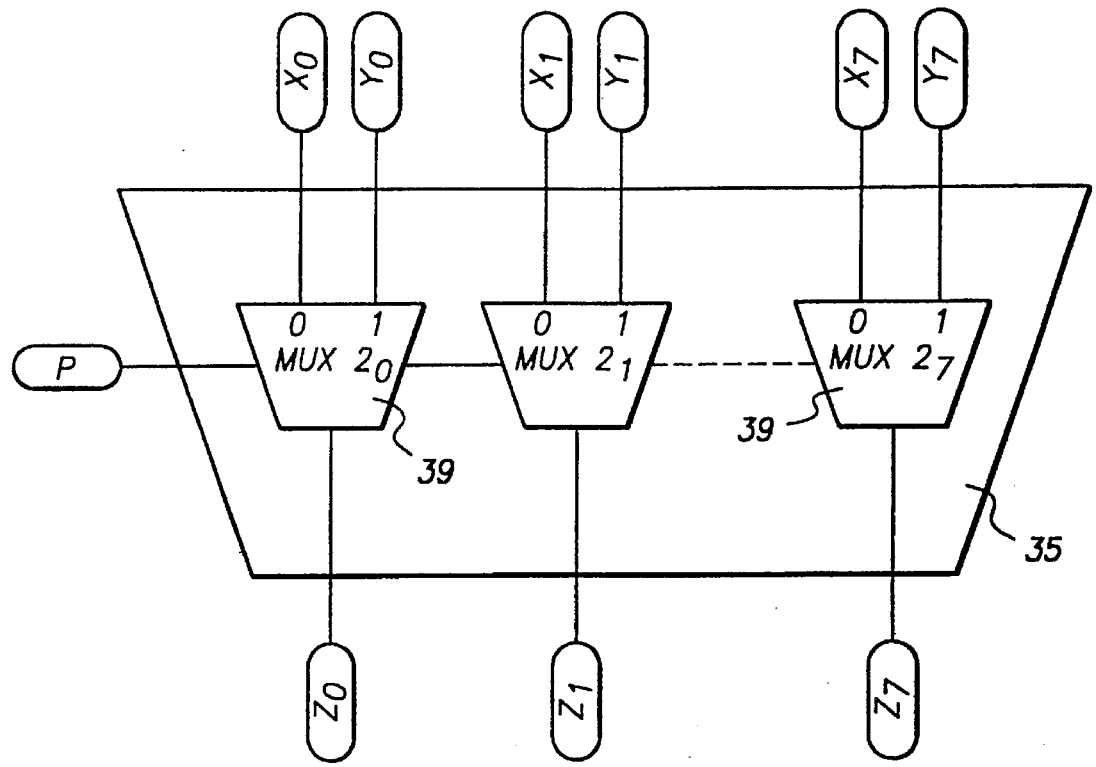
FIG. 9 is a schematic diagram showing details of the sixteen bit input, eight output multiplexer used in the SWAP block of FIG. 7.

Referring now to FIG. 9, a detailed schematic diagram of multiplexer 35 is shown as an array of parallel two-bit multiplexers having 16 inputs $X_0$-$X_7$, and $Y_0$-$Y_7$, and having eight outputs $Z_0$-$Z_7$. The multiplexers 39 are controlled by permutation code P. Implementation of multiplexers 39 is conventional and is well known in the electronics arts.

Figure 10:
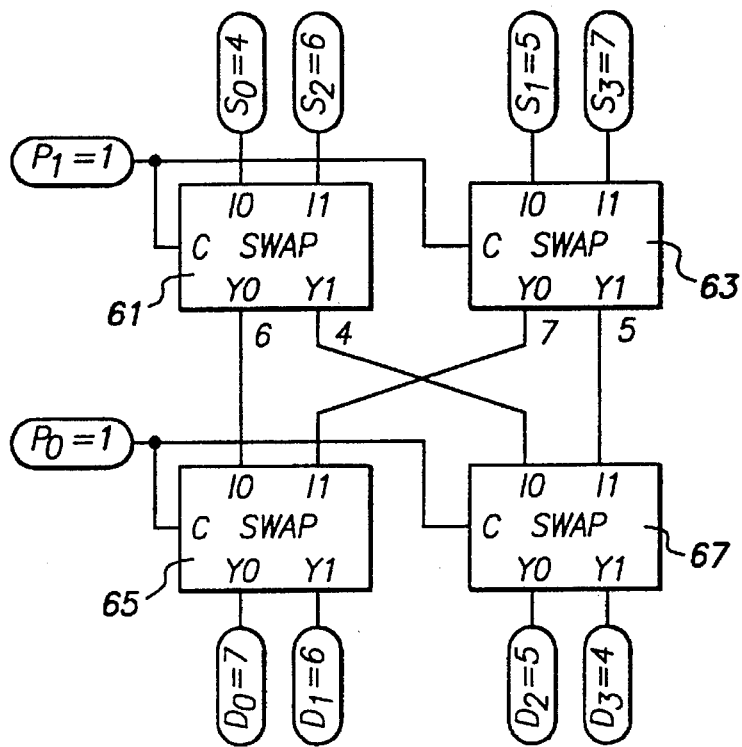
FIG. 10 is a schematic diagram showing the preferred embodiment for implementing the reordering of four bytes using combinational logic.

Referring now to FIG. 10, a schematic diagram is shown for implementing the translation example of FIG. 5(*a* and FIG. 5(*b*). The source sequence of FIG. 5(*a*) and FIG. 5(*b*) is in big-endian format and consists of the sequence of bytes 4567. The permutation code was determined to be 11 binary using the method discussed above. As an example of use of the present circuit, four swap cells, 61, 63, 65, and 67, are shown in the ordered arrangement discussed with respect to FIG. 7 above. Swap cells 61 and 63 are controlled by permutation signal $P_1$, and the outputs from swap cells 61 and 63 feed into swap cells 65 and 67, which are controlled by permutation signal $P_0$. Swap cells 61 and 63 receive inputs $S_0$, $S_2$ and $S_1$, $S_3$, respectively, and swap cells 65 and 67 generate outputs $D_0$, $D_1$ and $D_2$, $D_3$, respectively. Referring to the example then in FIG. 5(*a*) and FIG. 5(*b*), swap cell 61 receives source sequence bytes 4 and 6, while swap cell 63 receives source sequence bytes 5 and 7. The permutation signal was determined above to be 11 binary; that is, $P_1=1$ and $P_0$32 1. With $P_1=1$, $S_0=4$ appearing at the $I_0$ input of swap cell 61 is transmitted to the $Y_1$ output; and the $S_2=6$ input appearing at the $I_1$ input of swap cell 61, appears at the $Y_0$ output. Similarly, the $S_1=5$ input, appearing at the $I_0$ input of swap cell 63, is output at the $Y_1$ output; while the $S_3=7$ signal appearing at the $I_1$ input, is transmitted through to the $Y_0$ output. The outputs from the $P_1$ level are then input into swap cells 65 and 67 at the $P_0$ level, where the $S_2=6$ input now appears at the $I_0$ input of swap cell 65, and with $P_0=1$ is output as $D_1$. The $S_3=7$ input to swap cell 63 now appears as the $I_1$ input to swap cell 65, and when $P_0=1$, $S_3=7$ is output as $D_0$. $D_2=5$ results from the propagation of the $I_1$ input of swap cell 67, which is produced by the $S_1=5$ input of swap cell 63. The $D_3=4$ output of swap cell 67 results from the $I_0$ input of swap cell 67, which in turn is generated from the $S_0$ input of swap cell 61.

Figure 11A:
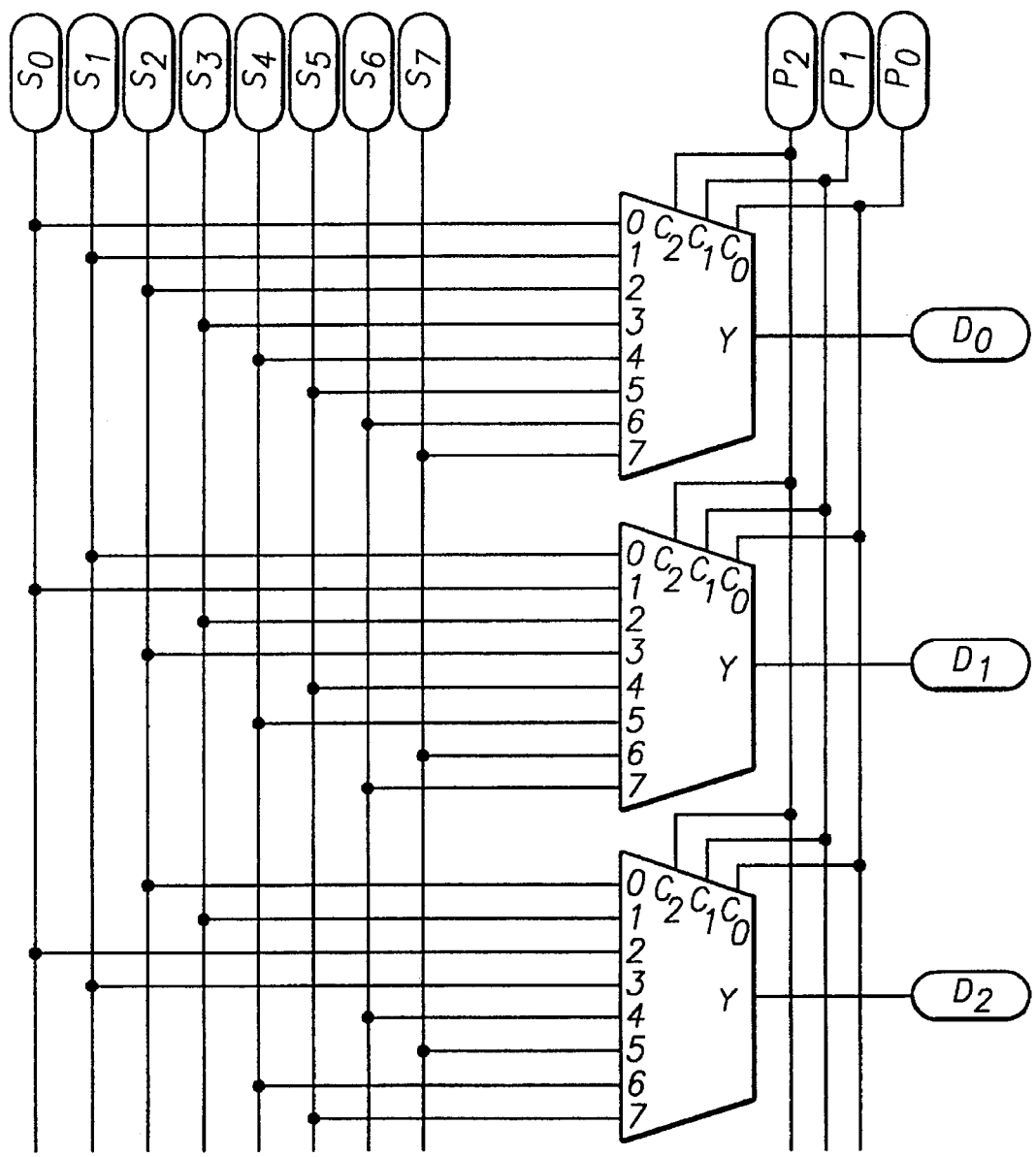
FIGS. 11(a) and FIGS. 11(b) comprise is a schematic diagram showing an alternative embodiment for implementing the reordering of eight bytes using combinational logic.
Figure 11B:
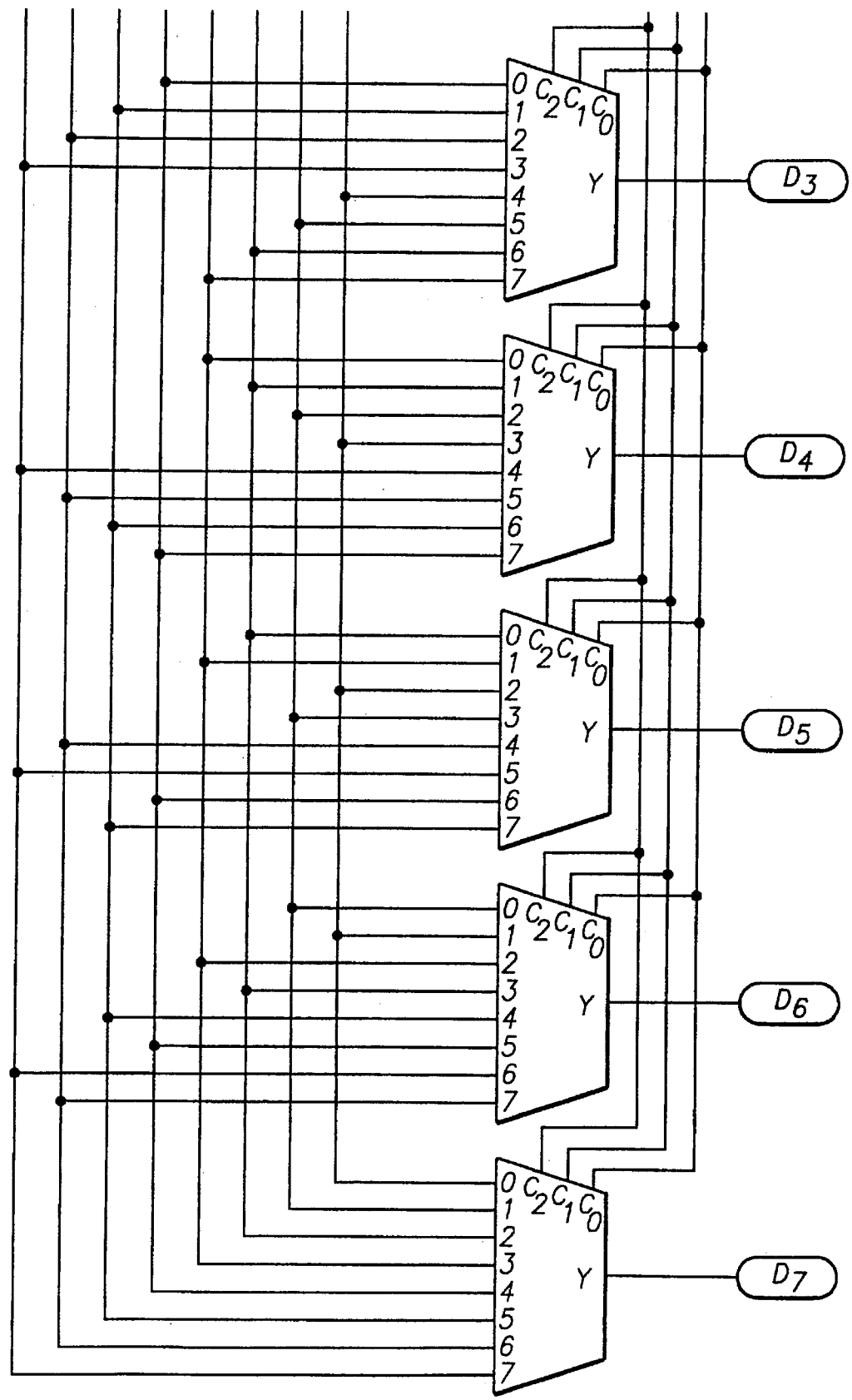

An alternative embodiment to the hardware circuit of FIG. 7 for reordering bytes from a source sequence to a destination sequence given a known permutation code, is shown in FIG. 11 (including details FIG. 11(*a*) and FIG. 11(*b*)). This circuit implements the equation:

$$D[i]=S[i \text{ XOR } E_P],$$

for an eight byte circuit. The circuit of FIG. 11 can also be expanded to generally include any number of bytes as discussed above. In general, the circuit consists of an array of multiplexers having a number of inputs equal to the number of bytes or units being reordered, and a number of control lines equal to the number of bits in the permutation code $E_P$. For an eight byte source code as shown in FIG. 11, the multiplexers used are eight to one multiplexers, each having three control signal inputs. The advantage to the embodiment of FIG. 11 over that of FIG. 7, is that only a single layer of logic is used, thereby reducing the number of gate delays in propagating the source sequence into a reordered destination sequence.

Figure 12:
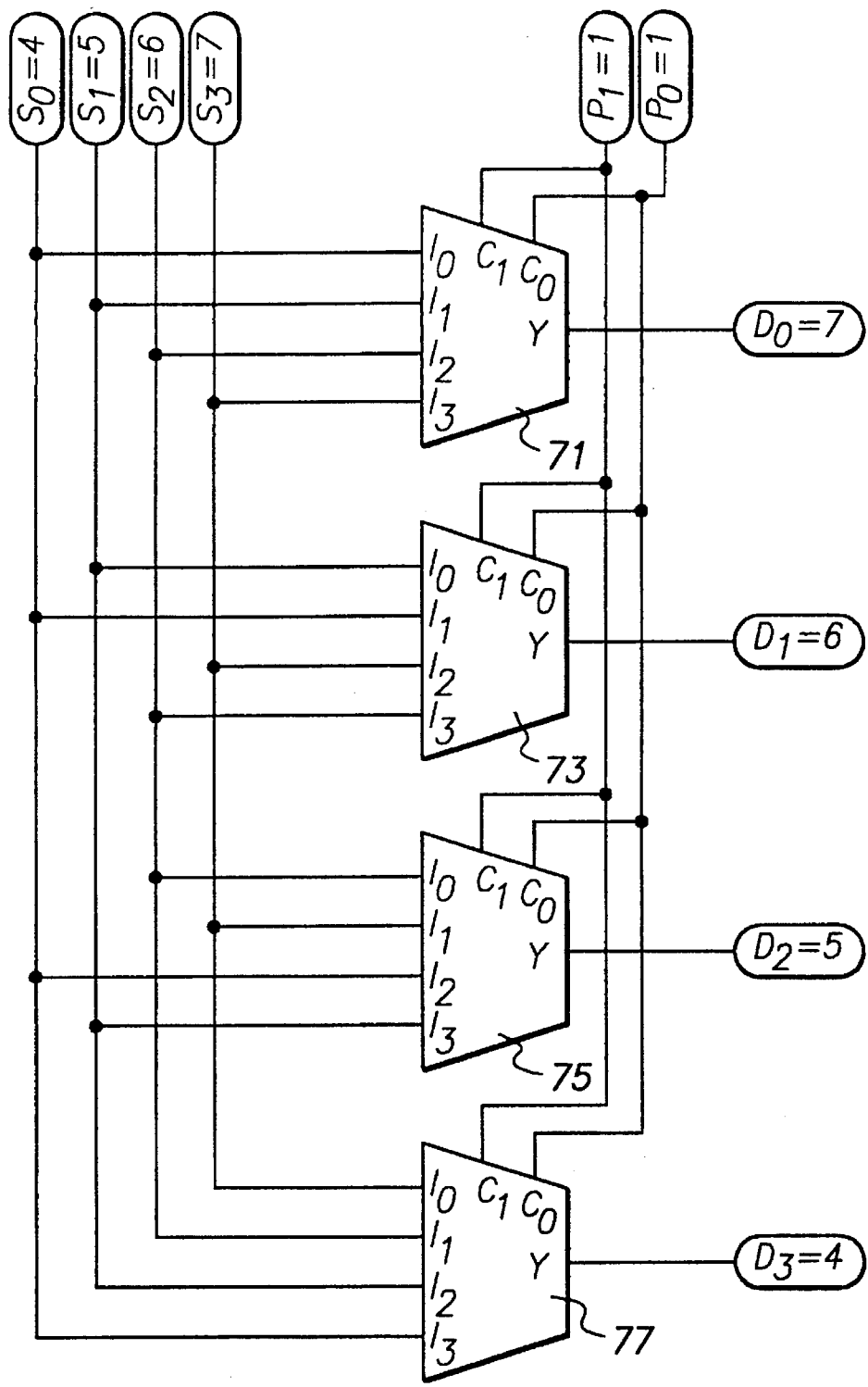
FIG. 12 is a schematic diagram showing an alternative embodiment for implementing the reordering of four bytes using combinational logic.

FIG. 12 shows a four byte implementation of the example of FIG. 5(*a*) and FIG. 5(*b*) in which the source sequence 4567 is reordered into a destination sequence of 7654. As in the example of FIG. 5(*a*) and FIG. 5(*b*), the permutation code $E_P$ is equal to 11 binary.

Each of the multiplexers 71–77 receive source inputs $S_0$–$S_3$, which in this example is equal to the sequence of bytes 4, 5, 6, 7. Multiplexer 71 receives $S_O$ at its $I_0$ input, $S_1$ at its $I_1$ input, $S_2$ at its $I_2$ input and $S_3$ at its $I_3$ input. The control signals $C_0$ and $C_1$ are equal to $P_0$ and $P_1$ respectively. Since in example 5 the permutation code $E_P=11$ binary, each of the multiplexers 71–77 select the $I_3$ input for propagation to the output Y. Multiplexer 71 propagates $S_3$ as its $I_3$ input to produce $D_0$=7. Multiplexer 73 propagates $S_2$ as its $I_3$ input to produce $D_1$=6. Likewise, multiplexers 75 and 77 propagate $D_2$=5 and $D_3$=4, respectively.

Figure 13:
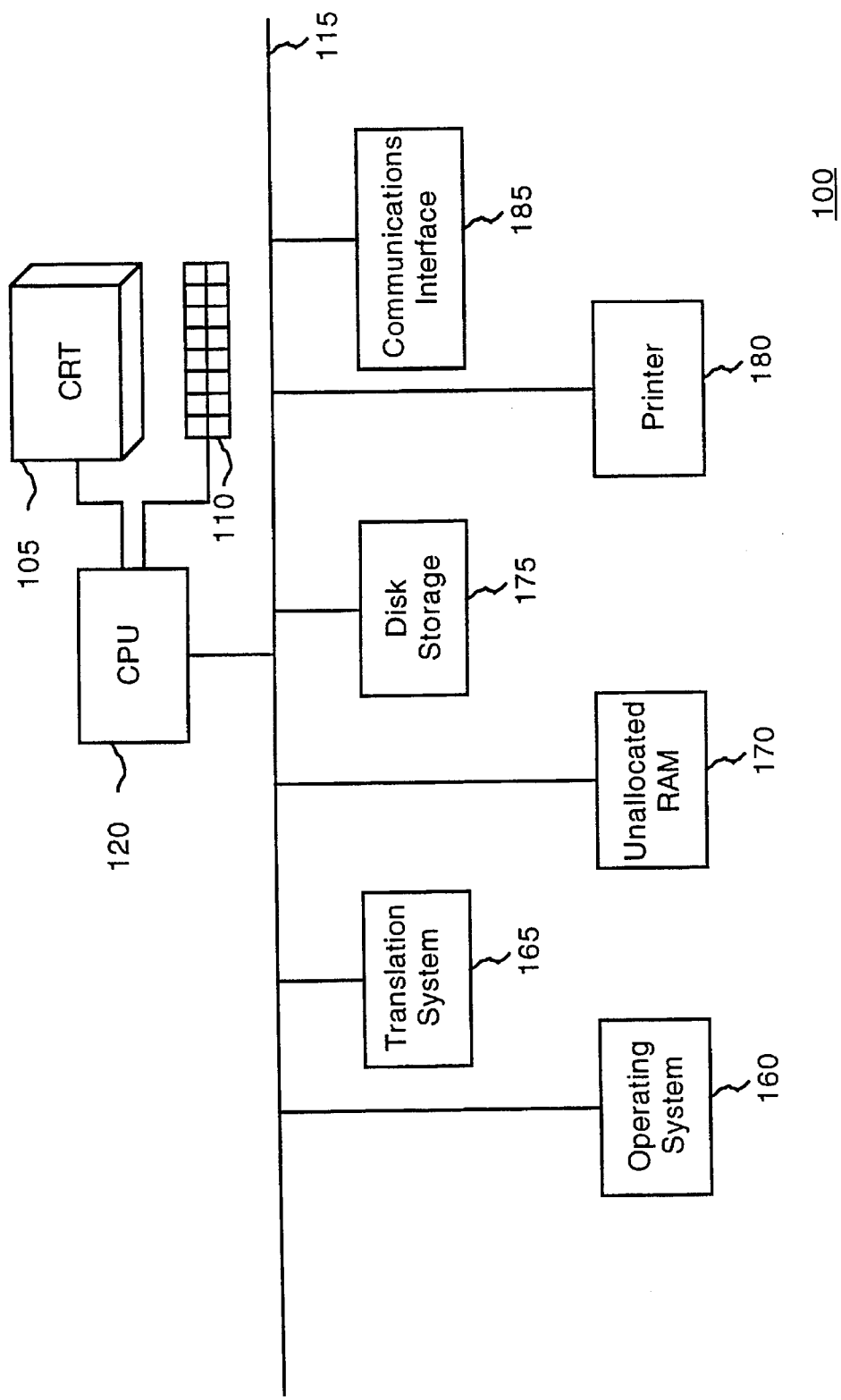
FIG. 13 is a block diagram of a computer system for translating source sequences of ordered data units into destination sequences having different orderings in accordance with the present invention.

FIG. 13 is a block diagram of a computer system 100 capable of implementing a translation system 165 in accordance with the present invention. Computer system 100 includes a CPU 120 coupled via data bus 115 to translation system 165 and memory 170, 175. The translation system 165 is loaded into RAM 170 and then executed by CPU 120. A computer system 100 operator uses a keyboard 110 and a CRT 105 to interact with CPU 120. The communications interface 185 receives and transmits source and destination signals to and from computer system 100 so that CPU 120 can generate the permutation and translation signals.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. A computer implemented method for translating a source sequence of ordered data units into a destination sequence having a different ordering of said data units, the method comprising the computer implemented steps of:

using machine-specific data unit packing parameters to generate a source sequence signal, $E_S$, which identifies the ordering of units within the source sequence;

using machine-specific data unit packing parameters to generate a destination sequence signal, $E_D$, which identifies the ordering of units within the destination sequence;

combining the source sequence signal and the destination sequence signal to produce a permutation signal, $E_P$, according to the formula:

$E_P$=($E_S$ XOR $E_D$)AND(n–1)

where n is equal to the number of data units to be translated and is greater than two; and reordering the units from the source sequence in response to the permutation signal to produce a translated destination sequence.

2. The method for translating according to claim 1, wherein the data unit is an eight-bit byte.

3. The method for translating according to claim 1, wherein the data unit is a single bit.

4. The method for translating according to claim 1, wherein n is equal to 2 raised to an integer power.

5. The method for translating according to claim 1, wherein the step of reordering the data units of the source sequence comprises:

determining a destination ordering index D(i) for each data unit of the source sequence based on a source ordering index S(i) of the unit's order in the source sequence, using the permutation signal, $E_P$, according to the formula:

D(i)=S(i XOR $E_P$).

6. A computer system for translating a source sequence of n ordered data units into a desired destination sequence having a different ordering, the computer system comprising:

means for using machine-specific data unit packing parameters to generate a source sequence signal, $E_S$, which identifies the ordering of units within the source sequence;

means for using machine-specific data unit packing parameters to generate a destination sequence signal, $E_D$, which identifies the ordering of units within the destination sequence;

means for combining the source sequence signal and destination sequence signal to produce a permutation signal, $E_P$ defined by the formula: $E_P$=($E_S$ XOR $E_D$)AND(n–1) where n is greater than two; and means for reordering the units from the source sequence in response to the permutation signal to produce a translated destination sequence of data units.

7. The system for translating according to claim 6, wherein the data unit is an eight-bit byte.

8. The system for translating according to claim 6, wherein the data unit is a single bit.

9. The system for translating according to claim 6, wherein the means for reordering the data units of the source sequence comprises:

means for determining a destination ordering index D(i) for each data unit of the source sequence using a source ordering index S(i) corresponding to each unit's location in the source sequence, and the permutation signal, $E_P$, in the formula:

D(i)=S(i XOR $E_P$).

10. The system for translating according to claim 6, wherein n is equal to 2 raised to an integer power.

* * * * *